United States Patent
Uhle et al.

(10) Patent No.: US 11,495,997 B2
(45) Date of Patent: Nov. 8, 2022

(54) METHOD AND SENSOR ARRANGEMENT FOR TRANSMITTING ENERGY TO A SENSOR

(71) Applicant: Endress+Hauser Conducta GmbH+Co. KG, Gerlingen (DE)

(72) Inventors: Jörg Uhle, Limbach-Oberfrohna (DE); Hendrik Zeun, Chemnitz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 17/552,836

(22) Filed: Dec. 16, 2021

(65) Prior Publication Data

US 2022/0190644 A1 Jun. 16, 2022

(30) Foreign Application Priority Data

Dec. 16, 2020 (DE) ...................... 10 2020 133 844.9

(51) Int. Cl.
*H02J 50/10* (2016.01)
*H02J 50/80* (2016.01)

(52) U.S. Cl.
CPC .............. *H02J 50/10* (2016.02); *H02J 50/80* (2016.02)

(58) Field of Classification Search
CPC ................................. H02J 50/10; H02J 50/80
USPC ....................................................... 307/104
See application file for complete search history.

(56) References Cited

U.S. PATENT DOCUMENTS

| 8,344,688 | B2 * | 1/2013 | Yoda | H02J 7/00045 |
| | | | | 320/108 |
| 2008/0197802 | A1 * | 8/2008 | Onishi | H02J 7/0044 |
| | | | | 320/108 |
| 2009/0001932 | A1 * | 1/2009 | Kamijo | H02J 50/60 |
| | | | | 320/108 |
| 2009/0174364 | A1 * | 7/2009 | Onishi | H02J 50/10 |
| | | | | 320/108 |

FOREIGN PATENT DOCUMENTS

| DE | 19719730 | C1 | 10/1998 |
| DE | 10348569 | A1 | 5/2005 |
| DE | 102006005632 | A1 | 8/2007 |
| DE | 102006062184 | A1 | 6/2008 |
| DE | 102007041238 | A1 | 3/2009 |
| DE | 102011076135 | A1 | 11/2012 |
| DE | 102018122015 | A1 | 3/2020 |

* cited by examiner

*Primary Examiner* — Alfonso Perez Borroto
(74) *Attorney, Agent, or Firm* — Mark A. Logan; Endress+Hauser (USA) Holding Inc.

(57) ABSTRACT

A method for transmitting energy to a sensor comprises transferring energy from a primary side having a primary coil to a secondary side having a secondary coil, wherein the sensor is arranged on the secondary side, wherein transfer of energy occurs via the two coils, wherein the two coils are designed to transmit data bidirectionally; acquiring a measured variable using the sensor; transmitting the measured variable from the secondary side to the primary side; requesting an energy pulse from the primary side when an event occurs that requires more energy; interrupting transmission of the measured variable; transmitting an energy pulse from the primary side to the secondary side; and returning to the normal mode upon acquisition of the measured variable; and transmitting to the primary side the measured variable. Also disclosed is a corresponding sensor arrangement for carrying out the method.

12 Claims, 3 Drawing Sheets

METHOD AND SENSOR ARRANGEMENT FOR TRANSMITTING ENERGY TO A SENSOR

CROSS-REFERENCE TO RELATED APPLICATION

The present application is related to and claims the priority benefit of German Patent Application No. 10 2020 133 844.9, filed on Dec. 16, 2020, the entire contents of which are incorporated herein by reference.

TECHNICAL FIELD

The present disclosure relates to a method for transmitting energy to a sensor. The present disclosure further relates to a corresponding sensor arrangement for implementing the method.

BACKGROUND

A "sensor arrangement" consists of a sensor with a cable inductively connected thereto. The cable in turn is connected to a transmitter. For example, products sold by the applicant under the name "Memosens" are known. Such sensors use inductive energy and data transmission by means of two coils between the sensor and the cable.

With such inductive energy and data transmission systems, the efficiency and communication quality are generally dependent on the operating point, and the arrangement is operated at a target operating point (with corresponding transmission voltage and degree of modulation). However, depending on the tolerances of the system, deviations in communication quality and energy transmission may occur. The systems are generally designed for continuous operation around this operating point.

An increase in the primary voltage (i.e., the voltage at the primary coil) would make it possible to transmit more energy. However, this would lead to higher voltage levels on the secondary side. However, this leads to a loss of function or to failure of the secondary circuit. In these systems, a fixed operating point is required, for example, for safe communication.

SUMMARY

The present disclosure is based on the object of transmitting more energy to a sensor connected to a cable.

The object is achieved by a method comprising the steps of: Transferring energy from a primary side to a secondary side, wherein the sensor is arranged on the secondary side, wherein the primary side and the secondary side are coupled to each other via a primary coil and a secondary coil, and a transfer of the energy takes place by means of the two coils, wherein the primary coil and secondary coil are designed to transmit data thereby bidirectionally; acquiring a measured variable by means of the sensor; transmitting a value dependent on the measured variable from the secondary side to the primary side; requesting an energy pulse from the secondary side to the primary side when an event occurs that requires more energy; interrupting transmission of the value dependent on the measured variable; transmitting at least one energy pulse from the primary side to the secondary side, wherein the energy pulse is transmitted in an event-controlled manner, and returning to the normal mode upon acquisition of the measured variable and transmitting to the primary side the value dependent on the measured variable.

In one development, acquisition of the measured variable is interrupted, in particular before interruption of the transmission of the value dependent on the measured variable takes place and after requesting the energy pulse takes place.

The present disclosure makes it possible to increase energy transmission via the inductive interface by briefly transferring pulses of higher energy. As a result, more energy is available on the sensor side for the implementation of sensor functions. The target operating point in this case is left briefly and no communication takes place during this time.

One development provides that the method comprises the step: storing the additional energy from the energy pulse on the secondary side The energy pulse is transmitted in an event-controlled manner. Such an event may, for example, be: the energy store on the secondary side is empty or below a threshold value; the sensor is to be switched into a special mode, such as a mode for performing a software or firmware update, a cleaning mode, or if a specific measurement range is to be measured more precisely. It is also an event when an event is impending that requires a lot of energy. The sensor would therefore request additional energy just before starting this event. Even if the energy store is not yet particularly empty, in this case the store will be filled to its maximum.

The object is further achieved by a sensor arrangement, for carrying out the method as described above, the sensor arrangement comprising: a primary side comprising a power supply unit, a primary coil that is connected to the power supply unit and is configured to transmit energy and an energy pulse to a secondary coil, and to transmit or receive data bidirectionally, and a first data processing unit configured to control and optionally regulate the transmission of the energy and designed to generate, control and optionally regulate an energy pulse by means of the power supply unit, and to transmit to the secondary coil; and a secondary side with a sensor, the sensor comprising a secondary coil that is configured to receive energy and an energy pulse from the primary coil and to transmit or receive data bidirectionally, at least one voltage limiter for limiting the input voltage at the secondary coil, wherein the voltage limiter is connected to the secondary coil, a sensor element for detecting at least one measured variable, and a second data processing unit connected at least to the sensor element and to the secondary coil, wherein the second data processing unit is designed to generate data correlated with the measured variable.

One development provides that the sensor arrangement comprises: at least one energy store on the secondary side, which energy store is connected to the secondary coil, which stores at least the energy from the energy pulse.

Due to the voltage limiter on the secondary side, a defined maximum voltage level on the secondary side is not exceeded. If the circuitry is designed in such a way that it can in principle be operated up to this point and does not turn out to be irreparable and integrates a circuit part that can store the increased voltage/energy levels, this additional energy can be effectively stored and later used.

The control of when an additional energy pulse is transmitted, how long it is and which further parameters it has, takes place internally, for example by means of the data processing unit(s). The system uses these control parameters to coordinate internal measurements, calculations, communication periods, charging and discharging processes and other processes dependent on the operating point. In one development, control is carried out by the primary side (e.g., first data processing unit or a connected measuring transducer) and the secondary side (i.e., sensor with the second data processing unit) follows the control parameters.

One development provides that the sensor arrangement comprises: an energy store on the primary side. This development is useful, for example, in the case of two-wire devices that naturally cannot have much energy. In two-wire devices, the energy pulse is transmitted during periods in which less energy is regularly consumed, so that energy management of the two-wire device is not unduly burdened.

Four-wire devices can in principle also comprise such an energy store on the primary side. However, it can in principle be assumed that an amount of energy reaching the transmittable maximum can be provided by the four-wire device on the primary side. Here, the limiting factor, which reduces the amount of energy, is the fact that for communication of the measured values "normal operation" must be activated.

One development provides that the sensor arrangement comprises: a control element, in particular a transistor, on the primary side for generating the energy pulse.

One development provides that the sensor arrangement comprises: a control element, in particular a transistor, on the secondary side for passing the energy pulse through to the energy store or to a consumer.

One development provides that the sensor arrangement comprises: a regulator, in particular a linear regulator or switching regulator, which is connected downstream of the energy store on the secondary side.

One development provides that the regulator is designed as a buck regulator.

One development provides that the sensor arrangement comprises: a separation circuit, especially, at least one diode, which is connected between the energy store and the sensor element.

BRIEF DESCRIPTION OF THE DRAWINGS

This is explained in more detail with reference to the following figures.

In the figures, the same features are identified by the same reference signs.

DETAILED DESCRIPTION

Figure 1:
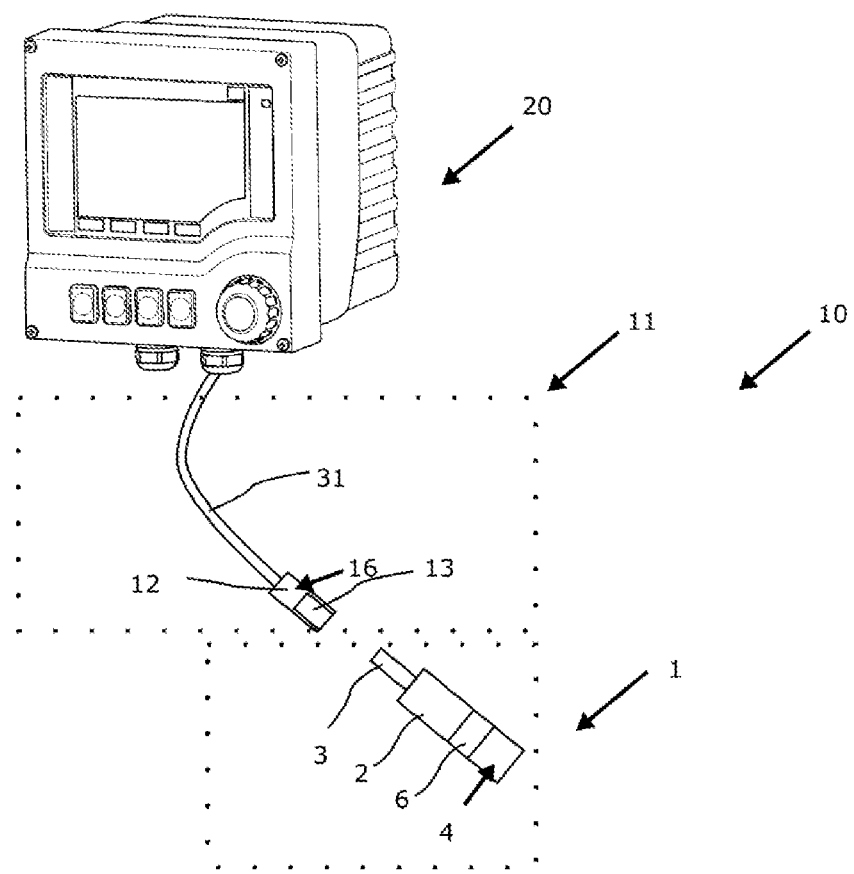
FIG. 1 shows the claimed sensor arrangement.

A claimed sensor arrangement comprises a sensor 1 and a corresponding remote station 11. The sensor arrangement 10 is shown in an overview in FIG. 1. The primary side comprises the remote station 11; the secondary side comprises the sensor 1. The sensor 1 communicates with the remote station 11 and the higher-level unit 20 connected thereto via an interface 3. In the example, a transmitter is connected. The transmitter is in turn connected to a control system (not depicted). In one development, the sensor 1 communicates directly with a control system via the remote station 11. A cable 31 is connected at the sensor side to the transmitter 20, and its other end comprises an interface 13 that is complementary to the interface 3. The remote station 11 comprises the cable 31 along with interface 13.

The interfaces 3, 13 are designed as galvanically isolated inductive interfaces that can be coupled to each other by means of a mechanical plug connection. The interfaces 3, 13 thus form the primary coil and the secondary coil, wherein these terms are used complementarily within the meaning of this document. The mechanical plug connection is hermetically sealed, such that no fluid, such as the medium to be measured, air, or dust can enter from the outside.

Data are transmitted and received (bidirectionally) via the interfaces 3, 13. Energy is sent unidirectionally, i.e. from the primary side to the secondary side, via the primary and secondary coils. The sensor arrangement 10 is used predominantly in process automation.

The sensor 1 comprises at least one sensor element 4 (only indicated and shown symbolically in FIG. 1) for acquiring a measurement variable of process automation. The sensor 1 is then for example a pH sensor, also known as ISFET, generally an ion-selective sensor, a sensor for measuring the redox potential, the absorption of electromagnetic waves in the medium, for example with wavelengths in the UV, IR and/or visible ranges, oxygen, conductivity, turbidity, the concentration of non-metallic materials, or temperature with the respective measurement variable.

The sensor 1 comprises a first coupling body 2, which comprises the first interface 3. For the purposes of this application, this interface is the secondary coil 3. The first coupling body 2 is cylindrical and has, for example, an external diameter of 12 mm.

As has been mentioned, the secondary coil 3 is designed to transmit to the primary coil 13 a value that is dependent on the measured variable. The sensor 1 comprises a data processing unit 6, such as a microcontroller, which processes the values of the measurement variable, for example converts them into a different data format. In this way, an averaging, pre-processing and digital conversion can be carried out by the data processing unit. The sensor 1 comprises a data memory, wherein the data memory comprises persistent data, especially calibration data, serial number, tag, calibration values and/or a logbook, of the sensor. Here "persistent data" should be understood to mean data that "cannot be changed in an uncontrolled manner", i.e. that the data remain (stored) even after the program or the sensor 1 has been terminated (possibly even in the event of an unforeseen termination, e.g. a power failure) and that can be reconstructed and displayed again when the program is relaunched.

The remote station 11 can also comprise a data processing unit, for example a microcontroller.

The sensor 1 can be connected via the interfaces 3, 13 to the remote station 11, and ultimately to a higher-level unit 20. As mentioned previously, the higher-level unit 20 is, for example, a transmitter or a control center. The data processing unit 6 converts the value that is a function of the measurement variable into a protocol that can be understood by the transmitter or the control center. Examples of this include, for example, the proprietary Memosens protocol or else HART, wirelessHART, Modbus, PROFIBUS Foundation Fieldbus, WLAN, ZigBee, Bluetooth, or RFID. This conversion can also be carried out in a separate communications unit instead of in the data processing unit, wherein the communication unit is arranged on the side of the sensor 1 or of the remote station 11. The aforementioned protocols also include wireless protocols, so that a corresponding communications unit includes a wireless module. The interfaces 3, 13 are thus designed for bidirectional communication between sensor 1 and higher-level unit 20. As mentioned, the sensor 1 is supplied with energy thereby; see below.

The remote station 11 comprises a data processing unit 16. The data processing unit 16 may serve as a repeater for the transmitted signal. Furthermore, the data processing unit 16 can convert or modify the protocol.

The remote station 11 further includes a second, cylindrical, coupling body 12 that is designed to be complementary to the first coupling body 2 and which with a sleeve-like end section can be plugged onto the first coupling body 2, wherein the interface 13 is plugged into the interface 3. An opposite arrangement, in which the interface 13 has a sleeve-like design and the interface 3 has a plug-like design, is possible without any inventive step. The second coupling body 12 has at least in parts a hollow cylindrical shape with an internal diameter of 12 mm.

Figure 2:
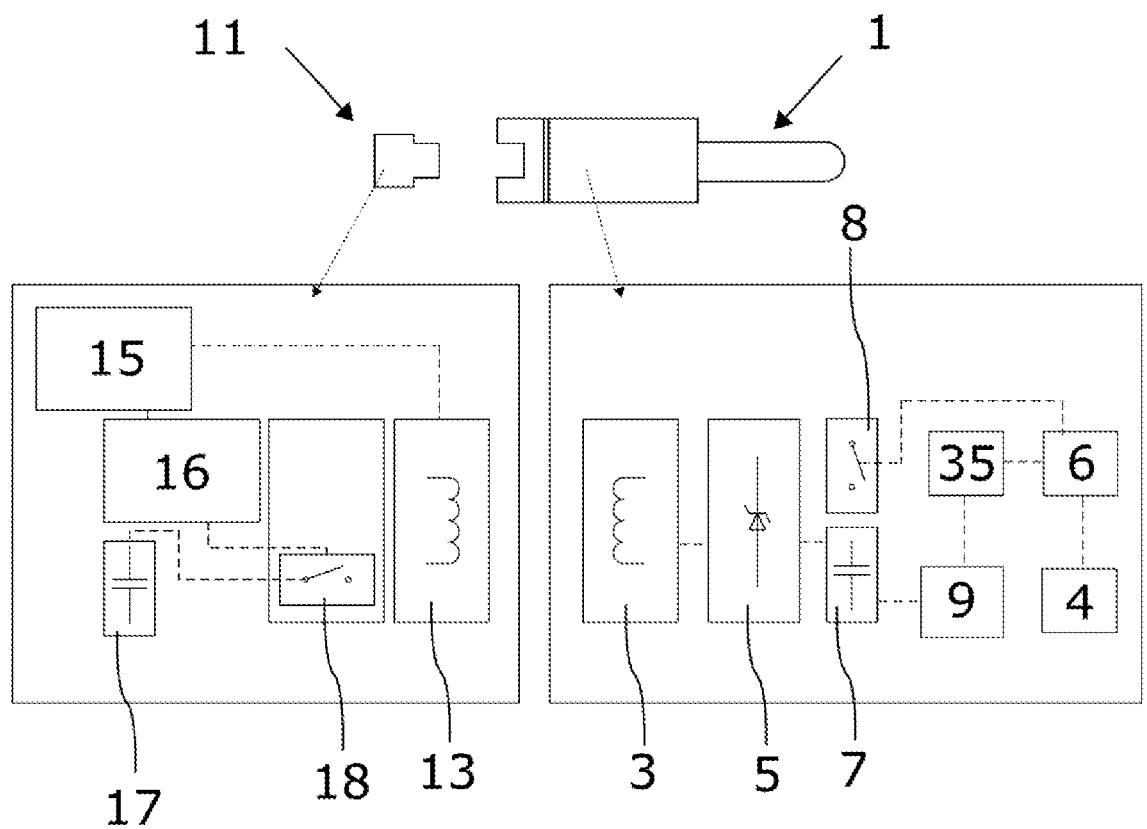
FIG. 2 shows the claimed sensor arrangement with the sensor and the cable, together with further details.

FIG. 2 shows the sensor 1 and the remote station 11 with the respective components, wherein the respective sides are indicated by a dashed arrow.

As mentioned, the sensor 1 is supplied with power via the interfaces 3, 13. For this purpose, energy is transmitted from the primary side to the secondary side with the sensor 1. This guarantees normal operation N. Additionally, an energy pulse can be transmitted from the primary side to the secondary side, wherein the additional energy is then initially stored on the secondary side. Finally, the stored energy is passed on to the consumer or consumers; see below.

Figure 3:
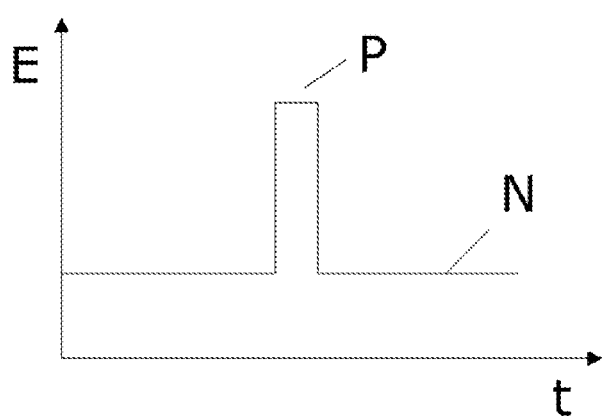
FIG. 3 shows a time-voltage diagram for the claimed method.

FIG. 3 shows a time-energy diagram with time t, energy E and energy pulse P, which is transmitted in addition to normal operation.

The energy pulse is transmitted in an event-controlled manner, i.e. the pulse is requested in an acyclic mode. The timing and control are handled via the data processing units 6, 16. The chronological sequence of the individual steps (see below) is thus controlled via the data processing units 6, 16.

In general, when the energy store 7 is empty the pulse P can be requested and sent. It is also possible for the energy store 7 to be charged shortly before the energy is required. Depending on the type of sensor, this can be dependent on a measured value, e.g., when cleaning is being carried out, etc. There is a further possibility when a measurement that requires an especially large amount of energy is to be carried out, because it must be either more precise than usual (longer measuring time) or takes place in a measuring range that is otherwise not regularly used (e.g. high conductivities in the case of conductivity sensors). These are "events" within the meaning of the application.

For this purpose, the primary side comprises a power supply unit 15 for supplying the sensor 1. The power supply unit 15 can be, for example, the transmitter 20, which then forms part of the secondary side. The power supply unit 15 can also be a power supply unit that depends accordingly on an energy network.

The primary coil 13 is connected to the power supply unit 15.

The data processing unit 16 controls and (if applicable) regulates the transmission of the energy for normal operation. Furthermore, it is designed to generate, to control, where appropriate to regulate the energy pulse P by means of the energy source 15 and to transmit it to the secondary coil 3 with the sensor 1. The system on the primary side is thus put into a mode in which it generates a higher voltage than in normal mode.

Depending on the type of energy source 15, the primary side comprises an energy store 17, i.e., for example, one or more capacitors. This is especially expedient or necessary when the energy source 15 cannot supply enough energy for the pulse P and the energy required for the pulse P can thus be buffered.

The primary side comprises a control element 18, in particular a transistor, for generating the energy pulse in interaction with the energy source 15, and optionally the energy store 17. By switching the control element 18, the primary side is put into the mode of increased energy transmission.

On the primary side, one or more capacitors are arranged next to the primary coil 13 (not shown; possibly also in addition to the energy store 17). Coil and capacitor(s) form a resonant circuit. The resonant circuit is changed by the control element 18 in that one or more further components, in particular one or more further capacitors, are switched on by means of the control element 18.

The secondary side is then put into a mode that enables reception of the pulse P, i.e. the passage of the energy pulse through to the energy store or directly to the consumer, for example also by means of a control element 8. The control element 8 on the secondary side ensures, for example, that the load on the secondary side is reduced. Although communication is thereby interrupted for the duration of the pulse P, increased energy transmission is enabled.

Energy is thus regularly transferred from the primary side to a secondary side and in principle data are sent bidirectionally. The sensor 1 collects measurement data, i.e., a measured variable of process automation technology. These data, or values dependent on the measured variable, are then transmitted from the secondary side to the primary side.

Then there is a request for an energy pulse P from the secondary side to the primary side when an event occurs, namely that more energy is required. In one development, acquisition of the measured variable is then interrupted. The value dependent on the measured variable is then transmitted. Furthermore, the transmission of at least one energy pulse P from the primary side to the secondary side takes place, wherein the energy pulse P is transmitted in an event-controlled manner.

Finally, there is a return to normal mode, i.e., the acquisition of the measured variable, and transmission to the primary side of the value dependent on the measured variable starts again.

Initially at least one voltage limiter 5 for limiting the input voltage at the secondary coil 3 is connected downstream of the secondary coil 3.

The additional energy from the pulse P can be used directly, depending on the type of sensor. For example, a sensor, which only needs to be cleaned occasionally by means of an ultrasonic actuator, requires a relatively large amount of energy for this action. The actuator is then operated directly during transmission of the higher energy, and the energy does not need to be temporarily stored.

In one development, the sensor 1 comprises at least one energy store 7, which is connected to the secondary coil 3—optionally via the voltage limiter 5—wherein said energy store stores at least the energy from the energy pulse P.

The energy store 7 comprises one or more capacitors, such as chip multilayer capacitors. This can also be achieved by using one or more capacitors connected in parallel. The energy is stored by charging the capacitors to a (temporarily) increased input voltage. Reasonable amounts of energy here are 10 to 20 mJ. The capacitors are here charged to the maximum possible input voltage (see voltage limiter 5, for example, approximately 15-35 V, in particular 20 V). These amounts of energy can still be transmitted/charged in a sufficiently short time. A typical pulse duration is, for example, 50-250 ms, in particular 100 ms. During the remaining time (e.g., an interval of 100-750 ms, in particular 300 ms), the stored energy can be used and the sensor 1 can be operated in normal operation N. The capacitor 7 is arranged after a rectification following the secondary coil 3 or the limiter on the secondary side. Rectification can be a simple rectification or a bridge rectification.

The storage capacitor 7 is separated from the rest of the input circuit (in particular from the data processing unit 6 and the sensor element 4) by a separation circuit 9, for example a diode. The separation serves to prevent the capacitor 7 from acting as an additional capacitive load during normal operation N. If the capacitor 7 is not discharged below rated input voltage, no current will flow to the capacitor during rated operation.

The discharge process finally takes place via a regulator 35, for example a linear regulator or switching regulator, in particular a buck regulator, for example, a DC/DC converter).

The storage capacitor 7, the regulator 35 and the remaining components of the rest of the supply circuit must be designed accordingly for the increased input voltage of the pulse P.

The discharge/power output can be correspondingly controlled by the data processing unit 6 via control inputs or feedback inputs on the regulator 35.

Measurement of the state of charge of the storage capacitor 7 can optionally take place via the analog/digital converter of the data processing unit 6, optionally with an upstream voltage divider.

The sensor 1 comprises a consumer that is connected to at least the energy store 7. Here, the "consumer" can, for example, be the data processing unit 6, the sensor element 4 or a cleaning unit. If there is no store, the consumer will be connected to the primary coil 13.

A time-based functional regime is helpful for the functioning of the principle:

The period of charging is clocked in the sensor arrangement 10. The microcontrollers 6, 16 are used for controlling the processes.

When the period of energy storage charging starts, the secondary circuit reduces its own power consumption as much as possible. As a result, a high input voltage can potentially be achieved and the losses resulting from the intrinsic input current remain low. The primary side increases the transmitted voltage to a maximum. Ideally, the voltage on the primary side is increased to such an extent that it is precisely the voltage-limiting measures on the secondary side that do not yet respond. As a result, a maximum of energy storage is achieved, and notwithstanding this, there are still no appreciable losses via the limiting elements. Given that the losses increase greatly when the voltage is increased above the voltage of the limiting measures, the system is self-limiting within a certain range. During the discharge process, i.e., the period in which the stored energy is used on the secondary side, the sensor and the cable are back in normal mode. Communication also becomes possible again during this period.

The energy stored in the capacitors 7 can be made available to the application via a regulator 35 (linear or switching regulator). As a result, larger input currents can be provided and a higher performance can thus be implemented by the application. The only condition for application is that the supply circuit parts are designed for the briefly increased voltage occurring during the charging process. As already mentioned above, a cleaning device, for example an ultrasonic actuator, is considered to be an "application." Further possibilities are, for example, a motor for moving a further component, for example a wiper for cleaning a surface, such as an optical window, or switching the sensor itself into a state with increased power consumption. This is thus the case, for example, when measurement must be more precise than usual (longer measuring time) or takes place in a measurement range that is otherwise not regularly used (e.g. high conductivities in the case of conductivity sensors).

The invention claimed is:

1. A method for transmitting energy to a sensor, comprising:
    transmitting energy from a primary side to a secondary side, wherein the sensor is arranged on the secondary side, wherein the primary side and the secondary side are coupled to each other via a primary coil and a secondary coil and the energy is transmitted via the two coils, wherein the primary coil and the secondary coil are designed to send data bidirectionally thereby;
    acquiring a measured variable using the sensor;
    transmitting from the secondary side to the primary side a value that depends on the measured variable;
    requesting an energy pulse from the secondary side to the primary side when an event occurs that requires more energy;
    interrupting the transmission of the value dependent on the measured variable;
    transmitting at least one energy pulse from the primary side to the secondary side, wherein the energy pulse is transmitted in an event-controlled manner; and
    returning to normal mode upon acquisition of the measured variable and transmitting to the primary side the value that is dependent on the measured variable.

2. The method according to claim 1, further comprising:
    storing additional energy from the energy pulse on the secondary side.

3. A sensor arrangement for transmitting energy to a sensor, comprising:
    a primary side, including:
        a power supply unit;
        a primary coil connected to the power supply unit and designed to transmit energy and an energy pulse to a secondary coil and to transmit or receive data bidirectionally; and
        a first data processing unit designed to control and optionally to regulate the transmission of energy and further designed to generate, to control, and to regulate the energy pulse by the power supply unit and to transmit the energy pulse to the secondary coil; and
    a secondary side including the sensor, the sensor including:
        a secondary coil designed to receive energy and an energy pulse from the primary coil and to transmit or receive data bidirectionally;
        a voltage limiter for limiting the input voltage at the secondary coil, wherein the voltage limiter is connected to the secondary coil;
        a sensor element for acquiring at least one measured variable; and
        a second data processing unit connected to the sensor element and to the secondary coil, wherein the second data processing unit is designed to generate data correlated with the measured variable.

4. The sensor arrangement according to claim 3, further comprising:
    an energy store on the secondary side, wherein the energy store is connected to the secondary coil and the energy store stores at least the energy from the energy pulse.

5. The sensor arrangement according to claims 3, further comprising:
   an energy store on the primary side.

6. The sensor arrangement according to claim 3, further comprising:
   a control element on the primary side for generating the energy pulse.

7. The sensor arrangement according to claim 6, wherein the control element is a transistor.

8. The sensor arrangement according to claim 4, further comprising:
   a control element on the secondary side for passing the energy pulse through to the energy store or to a consumer.

9. The sensor arrangement according to claim 8, wherein the control element is a transistor.

10. The sensor arrangement according to claim 8, further comprising:
    a regulator connected downstream of the energy store on the secondary side.

11. The sensor arrangement according to claim 10, wherein the regulator is designed as a buck regulator.

12. The sensor arrangement according to claim 4, further comprising:
    a separation circuit connected between the energy store and the sensor element.

\* \* \* \* \*